United States Patent [19]

Förster

[11] 4,231,295
[45] Nov. 4, 1980

[54] TRAFFIC SYSTEM FOR TRACK-TIED VEHICLES WITH STEERABLE AXLE

[75] Inventor: Hans-Joachim Förster, Stuttgart, Fed. Rep. of Germany

[73] Assignee: Daimler-Benz Aktiengesellschaft, Fed. Rep. of Germany

[21] Appl. No.: 808,367

[22] Filed: Jun. 20, 1977

[30] Foreign Application Priority Data

Jun. 23, 1976 [DE] Fed. Rep. of Germany ....... 2628217

[51] Int. Cl.² .............................................. E01B 25/28
[52] U.S. Cl. .................................... 104/245; 104/247; 180/131
[58] Field of Search ...................... 104/242, 243, 244.1, 104/245, 247; 180/79, 131

[56] References Cited

U.S. PATENT DOCUMENTS

| | | | |
|---|---|---|---|
| 3,343,501 | 9/1967 | Banderet | 180/131 |
| 3,397,651 | 8/1968 | Biedess | 104/244.1 |
| 3,645,211 | 2/1972 | Gretzschel | 104/242 |
| 3,782,293 | 1/1974 | Donohue et al. | 104/245 |
| 3,822,648 | 7/1974 | Ishii et al. | 104/245 |
| 3,853,069 | 12/1974 | Goodwin | 104/245 |
| 3,982,603 | 9/1976 | Michael | 104/244.1 |

Primary Examiner—John J. Love
Assistant Examiner—Ross Weaver
Attorney, Agent, or Firm—Craig & Antonelli

[57] ABSTRACT

A traffic system for track-guided vehicles with steerable wheels, in which a guide groove, guide web or the like, which determines the track and is adapted to be mechanically detected by the vehicles, is provided on the side of the road and a guide lever detecting the guide groove course is provided on the side of the vehicle, whereby the movements of the guide lever are adapted to be transmitted indirectly to the steerable wheels by interconnection of a force and movement transmission mechanism supplied with auxiliary energy; the guide lever which is pivotally connected at the axle member of the vehicle having the steerable wheels is deflectable within a small angular space that corresponds only to a fraction of the maximum deflection angle of the steerable wheels while additionally all parts that participate in the force flow of the movement transmission of the guide lever between the guide groove, on the one hand, and the axle member, on the other, are constructed so strong that the vehicle can be form-lockingly track-guided in an operationally safe manner and/or can be laterally forced off by way of the same, even without deflection of the steerable wheels; the force and movement transmission member is thereby designed for at least partial integrating behavior or proportional behavior.

40 Claims, 4 Drawing Figures

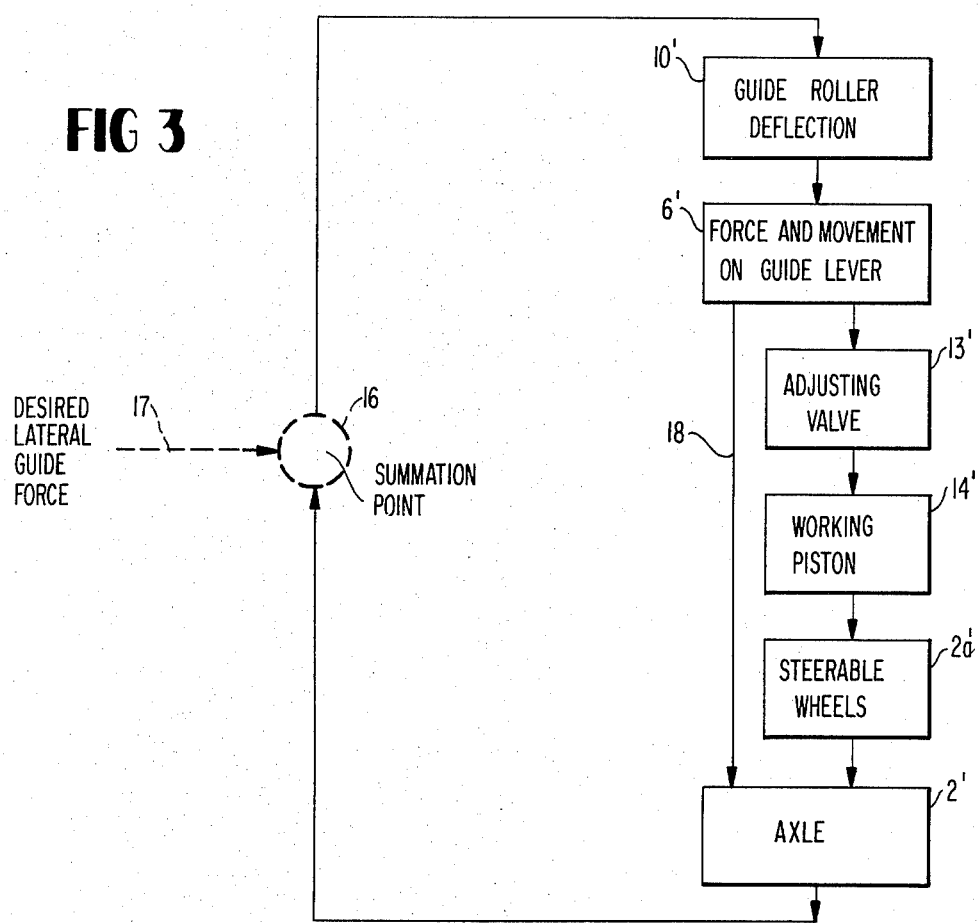
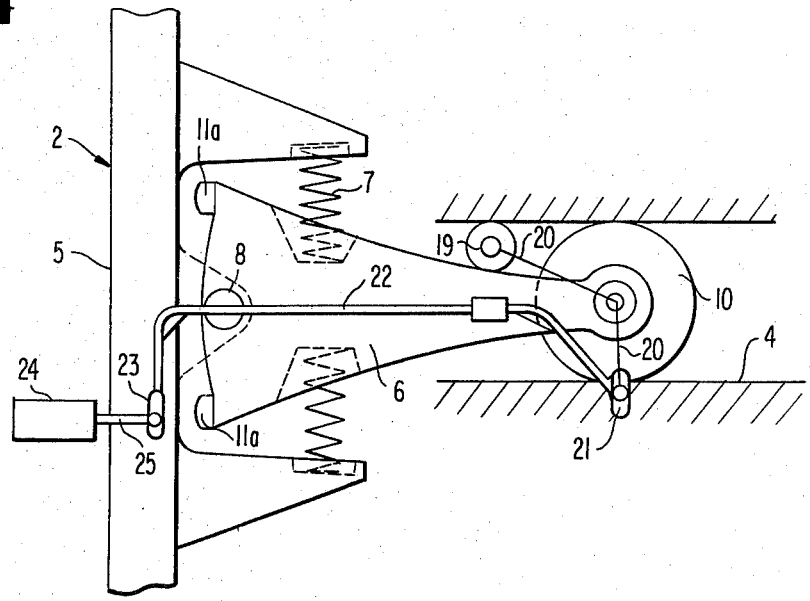

TRAFFIC SYSTEM FOR TRACK-TIED VEHICLES WITH STEERABLE AXLE

The present invention relates to a traffic system, especially to public passenger local traffic system for track-guided vehicles with steerable wheels, in which a guide groove, a guide web or the like adapted to be mechanically detected and defining the track is provided on the side of the road and a guide lever detecting the guide groove course is arranged on the side of the vehicle, whereby the movements of the guide lever are adapted to be transmitted indirectly to the wheels of the vehicles.

Such a traffic system combines the advantages of the purely track-tied traffic with separate line—namely high conveyance performance and great punctuality, small space requirement and partial automation capability—with the advantages of the track-independent or trackless road traffic—namely, good surface servicing and flexibility—under the prerequisite that the vehicles are convertible without difficulty between track and trackless traffic. A good surface service can be established in the outer areas in a flexible and cost-favorable manner as also a safe traffic on separate narrow tracks can be realized in the high density center.

Track-guided traffic systems with a detection of a guide device prescribing or indicating the track entail the disadvantage that the transverse forces have to be transmitted by way of the steerable and by way of the non-steered wheels. The transverse forces adapted to be transmitted and thus the track trueness therefore depend on the respective friction coefficient of the pairing road/road-surface, which depends on the weather conditions. This has an unfavorable effect on the track trueness. For safety reasons, guide planks have to be present on both sides at the vehicle tracks for the limitation of the lateral clearance space and for catching vehicles that might break out. These guide planks have to be constructed correspondingly strongly and correspondingly impact- or ram-surfaces have to be provided at the vehicle. This behavior of the vehicle which is relatively poor as regards track-trueness is very disadvantageous in the traffic system because the space requirement is correspondingly increased and the driving comfort is correspondingly decreased. As to the rest, the expenditures—guide planks and ramming surfaces or the like on the side of the vehicle—are also relatively high.

The present invention therefore proposes for the improvement of such a traffic system an arrangement pursuant to which the guide lever pivotally connected at the axle member of the vehicle axle with the steerable wheels is deflectable limitedly within a small angular space that corresponds only to a fraction of the maximum deflection angle of the steered wheels, that all parts which partake in the force flow of the movement transmission of the guide lever between the guide groove, guide web or the like, inclusive, on the one hand, and the axle body, on the other hand, are constructed so strongly that by way of the same the vehicle can be form-lockingly track-guided and/or laterally forced off in a harmless and operationally reliable manner—also without deflection of the steerable wheels—and that the force and movement transmission mechanism is constructed either for an at least partial integrating behavior or for a proportional behavior. The guide lever and the guide groove are therefore utilized directly for the form-locking track guidance of the vehicle by reason of their corresponding dimensioning. In the system according to the present invention, the vehicle is guided in principle form-lockingly along a predetermined track. On the other hand, the necessary transverse forces are absorbed by this guidance in case of control only to a small extent because a small control path or travel between the guidance and the form-locking connection permits the control of the steering system so that a large portion of the transverse forces has to be absorbed by way of the lateral guide force of the tires. As long as the force component of the tires is not built up fully, for example, during the transition phase of a control operation or with lacking adherence of the tire, the guide element takes over the entire guidance in a form-locking manner.

The advantage of the system according to the present invention resides, on the one hand, in the very simple construction of the control system, and, on the other, in that the track guide elements also assume the task of the "guide planks." For that purpose, they have to be constructed correspondingly sturdy without, however, being ever loaded highly. Since tires can transmit lateral forces only beginning with a certain inclined running, steering corrections about the zero position are always connected with a corresponding response time, i.e., response lag. Since, however, the lateral forces are small in this case, the guidance then is realized form-lockingly with this control system. Since the guide element of the road which acts as "guide plank" is intended to prevent a "derailment" of the vehicle in case of emergency, a pulling installation must also be provided for the non-steered rear axle which must permit a limited "play" by reason of the track deviations in curves.

The integrating behavior of the force and movement transmission means enables to construct the same in a very simple manner. As to the rest, by reason of the "forcible" steering by the guide lever which initially takes place form-lockingly by reason of the small steering deflections, an only slow deflection of the steerable wheels during the entry into a curve is tolerable and therewith an integrating behavior of the transmission member is permissive. The limitation of the guide lever to small deflections—this requirement follows from its use for the form-locking track guidance—makes necessary an at least partial integrating behavior of the transmission member in order that also larger deflection angles can be controlled with the aid of the deflection time of the guide lever. In a modified embodiment, in which the guide lever is combined with an installation detecting at least approximately the guide groove direction relative to the vehicle longitudinal axis and in which the track directional detecting member and possibly also the guide lever are coupled with the force and movement transmission member constructed and designed for proportional behavior, the steerable wheels are deflected corresponding to the detected track direction.

Accordingly, it is an object of the present invention to provide a traffic system for track guided vehicles with steerable axles which avoids by simple means the aforementioned shortcomings and drawbacks encountered in the prior art.

Another object of the present invention resides in a traffic system for vehicles with a steerable axle, which are adapted to be driven on tracks or on roads without tracks, which minimizes the space requirement and improves the driving comfort while simultaneously keeping relatively low the costs and expenditures connected with the system.

A further object of the present invention resides in a traffic system for vehicles of the type described above in which the guide lever and the guide groove are utilized directly for the form-locking track guidance of the vehicle.

Still a further object of the present invention resides in a traffic system for vehicles with steerable vehicle axles, adapted to be driven on tracks, which is simple in construction and requires only relatively simple parts.

These and other objects, features and advantages of the present invention will become more apparent from the following description when taken in connection with the accompanying drawing which shows, for purposes of illustration only, two embodiments in accordance with the present invention, and wherein:

FIG. 3 is a block diagram illustrating the control operations of the track guidance in accordance with the present invention; and FIG. 4 is a schematic top plan view of a modified embodiment of a track guidance of a vehicle in accordance with the present invention, illustrating the guide lever for a track guidance with track-direction detection.

Figure 1:
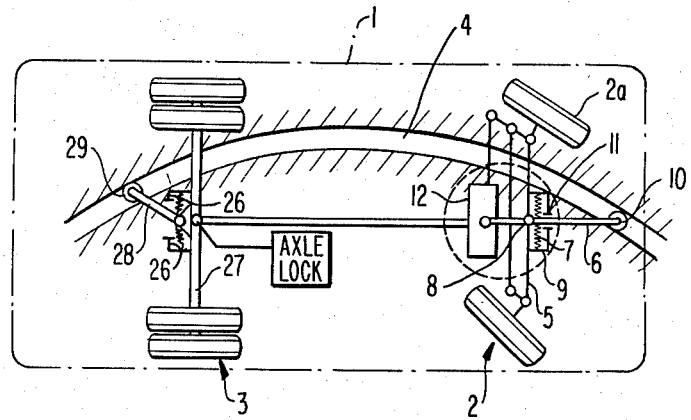
FIG. 1 is a schematic top plan view on a form-locking track guidance with force locking assistance of a vehicle along a guide groove according to the present invention.
Figure 2:
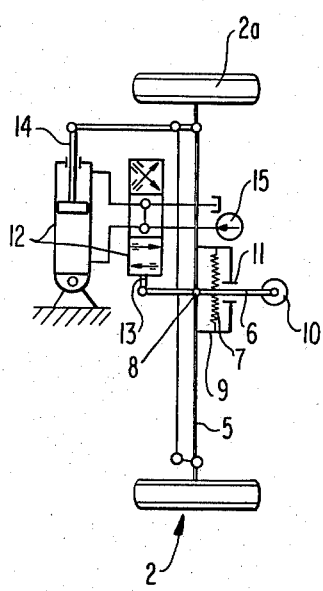
FIG. 2 is a schematic plan view of the control system of the steerable wheels in accordance with the present invention.

Referring now to the drawing wherein like reference numerals are used throughout the various views to designate like parts, and more particularly to FIG. 1, a vehicle 1 with a steerable front axle generally designated by the reference numeral 2 and a non-steerable rear axle generally designated by the reference numeral 3 which is also able to drive in a normal manner on vehicle roads is illustrated in this figure as travelling on a track having a guide groove 4. A strong guide lever 6 is pivotally connected at the front axle member 5 with the steerable wheels 2a, which is prestressed in a center position by way of prestressed centering springs 7 supported at the axle member 5. The pivotal connection 8 of the lever 6, the guide lever 6 itself as well as the springs 7 and their support 9, are dimensioned so sturdily that in case of small deflections the vehicle is track-guided by way of the guide lever 6 and its elastic support without having to rely on a corresponding transverse force-looking action of the wheels and, for example, can be forced off in the transverse direction. A guide roller 10 engaging in the guide groove 4 is mounted at the outer end of the lever 6. Also this roller 10 as well as the guide groove 4 are dimensioned correspondingly to the occurring transverse forces. The guide lever 6 is limitedly movable exclusively between rigid abutments 11. The centering springs 7 are so hard that, during the customary steering corrections, the limit abutment is not reached but instead the deflection is proportional to the track guidance forces. Upon abutment of the lever 6 at the abutments 11, the involved parts must be capable of absorbing and transmitting all of the forces which occur also with a strong vehicle steering action—for example with a lateral displacement of the vehicle. The lever 6 acts with a projecting part thereof on a force and movement transmission means 12 supplied with auxiliary energy by an oil pressure source 15 (FIG. 2). The force and movement transmission means 12 is designed and constructed for an integrating behavior, i.e., as long as the input element or adjusting value 13 of the transmission mechanism 12 is deflected out of a normal center position, the working piston or output member 14 is displaced in the corresponding direction. The displacement velocity is proportional to the amount of the deflection.

The operation of the track guidance installation will now be explained by reference to the block diagram of FIG. 3. A desired lateral guide force at the front axle guide roller 10, indicated by arrow 17, is established at the summation point 16, insofar as the installation is correspondingly constructed, which, however, as a rule is zero because the roller 10, with a track correct guidance, is moved in the guide groove 4 free of forces. With a desired force deviation, the guide roller 10 is deflected (block 10') and a corresponding force and movement is exerted on the guide lever 6 (block 6'). This deflection force is transmitted, on the one hand, directly to the axle itself (block 2') owing to a corresponding construction of the guide lever suspension at the axle, as indicated by arrow 18, and leads to an immediate change of the relative position of the axle with respect to the road. In addition thereto, however, the adjusting valve 13 (block 13') is actuated by the deflected guide lever 6 corresponding to the extent of the guide lever deflection. As a result thereof, the adjusting valve 13 (block 13') acts upon the working piston 14 corresponding to its opening, which in its turn, after overcoming a certain response time, deflects the steerable wheels 2a (block 2a'). This wheel deflection lasts for as long a time as the guide lever 6 is deflected and proceeds the faster, the further the lever is deflected. By reason of a beginning steering wheel deflection, the vehicle follows the guide groove track force-lockingly to an increasing proportion, i.e., by reason of the force-locking connection of wheel/road and not exclusively form-lockingly, i.e., by the connection guide roller/guide groove. Since the guide roller 10 is disposed in front of the steerable wheels 2a and the necessary track change is therefore detected correspondingly early, sufficient time remains with a correct mutual matching of the time constants, etc. of the elements in order to detect a geometric magnitude—radius of curvature of the curve—by a time magnitude—duration of the deflection.

A part of the front axle 2 is illustrated in FIG. 4 in which the track guidance is constructed with a track directional detecting means. A guide lever 6 is pivotally connected in FIG. 4 at the axle member 5 by way of a pivotal connection 8 with the guide lever 6 being prestressed in a center position by way of strong centering springs 7 supported at the axle member 5. The lever 6 is movable within the travel defined by the abutments 11a. A strong guide roller 10 is mounted at the end of the guide lever 6 which engages in a guide groove 4. In addition to the guide roller 10, a detecting roller 19 is provided, which continuously follows one of the guide groove flanks by reason of a spring force (not shown) pressing the detection lever 20 against one of the guide groove flanks. The detection lever 20 is constructed as two-armed lever which engages with its other end in a slide guide 21. The slide guide 21 is provided at the end of a cranked, longitudinally movably supported connecting rod 22 which is arranged centrally on the guide lever 6 and extends through the pivot connector 8 thereof. Outside of the guide lever 6, the rod 22 is cranked in the same direction as at the other end within the area of the guide roller 10 and a slide guide 23 extending transversely to the guide lever 6 is also provided thereat. The control pin 25 of a control valve 24 engages in this slide guide 23. The working piston (not shown) of a conventional force and transmission mechanism designed for proportional behavior follows the movement of this control pin 25 and transmits the movement to the steered wheels which are deflected correspondingly. The—limited—deflections of the guide lever 6 and those of the track directional detection means 19, 20 are added by the particular central arrangement of the cranked connecting rod 22.

The block diagram of FIG. 3 is also applicable with certain limitations to the track guidance system of FIG. 4 described above equipped with a detection of the track directional change of FIG. 4, by reason of the partial form-locking track guidance which is also utilized in that case. It would only be necessary to provide between the blocks "guide lever" (block 6') and "adjusting valve" (block 13') a block entitled "track directional detection." The force and movement transmission mechanism which is illustrated distributed over the two blocks "adjusting valve" (block 13') and "working piston" (block 14') would have to be considered—as mentioned—to be constructed for proportional behavior. However, it remains important also for the second modification of FIG. 4 that by reason of a strong guide lever which is limited in its movement freedom, a direct form-locking influence on the axle position takes place, indicated in FIG. 3 by the arrow 18, and that, in addition thereto, a wheel deflection influence for the force locking assist of the form-locking track guidance is provided.

The non-steerable rear axle 3—in the illustrated embodiment—is guided in the guide groove 4 by way of a strong, sturdily constructed pulling lever 28 having a pulling roller 29, which lever is also pivotally connected at the axle member 27 for limited angular movement by the presence of the abutments 26. As a result thereof, the vehicle rear portion is pulled radially outwardly so that the rear axle runs on a larger track radius than without such a pulling lever 28. As a result thereof, the rear axle follows the track of the steered front wheels. The space requirements of the vehicle in curve drives is smaller as a result thereof. The pulling movement would start gradually when driving through a curve, if the pulling lever 28 were also centered elastically in a center position, like the guide lever 6 which, however, is not illustrated. The form-locking pulling operations could also be assisted force-lockingly and, as a result thereof, the structural parts could be relieved of forces, if the rear axle were connected for angular movement with the vehicle body in a drive-stool-like manner of conventional type within an angular range of ±5°. The angular movement of the rear axle could be controlled by the pulling lever. However, the angular movement would have to be blocked when the vehicle travels on roads. For this purpose, a conventional locking means could be utilized for locking the rear axle in a center position.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A traffic system for track-guided vehicles which includes at least one vehicle axle having axle means connected with steerable wheels, the traffic system comprising a road-associated guide means for defining a drive track, a guide lever means arranged on the vehicle for detecting a course of the guide means, and further means for transmitting movements of the guide lever means indirectly to the steerable wheels including an auxiliary energy assisted force and movement transmission means, characterized in that the guide lever means is pivotally connected to the axle means, means are provided for limiting a pivotal deflection of the guide lever means over a relatively small angular path corresponding only to a fraction of a maximum deflection angle of the steerable wheels, the means for transmitting movements of the guide lever means includes means for defining a force-flow transmission path of the guide lever means between the guide means and the axle means and for enabling the vehicle to be track-guided along the guide means in a damage-free and operationally reliable manner without a deflection of the steerable wheels and in that a track directional detection means is provided for detecting at least approximately the direction of the guide means relative to a longitudinal axis of the vehicle including a detection lever means pivotally connected at a free end of the guide lever means.

2. A traffic system according to claim 1, characterized in that the means for defining the force-flow transmission path between the guide means and the axle means are constructed so strongly that the vehicle can be track-guided and forced off laterally of the guide means by way of the same in a damage-free and operationally reliable manner also without deflection of the steerable wheels.

3. A traffic system according to claim 1, characterized in that the force and movement transmission means includes an input means operatively connected to the guide lever means and an output member operatively connected to the input means so as to be responsive thereto.

4. A traffic system according to claim 3, characterized in that a centering spring means is supported at the axle means for prestressing the guide lever means to a center position.

5. A traffic system according to claim 4, characterized in that the means for limiting a pivotal deflection of the guide lever means includes rigid abutment means arranged on respective sides of the guide lever means.

6. A traffic system according to claim 5, characterized in that the centering spring means are constructed so hard that during most steering engagements required for track corrections, the centering spring means brace the guide lever means prior to an abutment at the rigid abutment means, and in that a displacement velocity of the force and movement transmission means is proportional to an amount of deflection of the input means in response to a pivotal deflection of the guide lever means.

7. A traffic system according to claim 6, characterized in that the means for defining the force-flow transmission path include at least one strong guide roller means arranged at a free end of the guide lever means so as to be engageable with the guide means.

8. A traffic system according to claim 7, with the vehicle including a rear axle means characterized in that a further lever means designed for the full transverse forces is pivotally connected at the rear axle means of the vehicle for also guiding the rear axle means along the guide means.

9. A traffic system for track-guided vehicles which includes at least one vehicle axle having axle means connected with steerable wheels, the traffic system comprising a road-associated guide means for defining a drive track, a guide lever means arranged on the vehicle for detecting a course of the guide means, and further means for transmitting movements of the guide lever means indirectly to the steerable wheels including an auxiliary energy assisted force and movement transmission means, characterized in that the guide lever means is pivotally connected with the axle means, means are provided for limiting a pivotal deflection of the guide lever means over a relatively small angular path corresponding only to a fraction of a maximum deflection angle of the steerable wheels including rigid abutment means arranged on respective sides of the guide lever means, the means for transmitting movements of the guide lever means includes means for defining a transmission path of the guide lever means between the guide means and the axle means, the means for defining the force-flow transmission path are constructed so strongly that the vehicle can be track-guided by way of the same in a damage-free and operationally reliable manner also without a deflection of the steerable wheels, the means for defining the force-flow transmission path includes at least one strong guide roller means arranged at a free end of the guide lever means so as to be engageable with the guide means, the force and movement transmission means includes an input means operatively connected to the guide lever means and an output member operatively connected to the input means so as to be responsive thereto, a centering spring means is supported at the axle means for prestressing the guide lever means to a center position, the centering spring means are constructed so hard that during most steering engagements required for track corrections, the centering spring means brace the guide lever means prior to an abutment of the rigid abutment means, a displacement velocity of the force and movement transmitting means is constructed proportional to an amount of deflection of the input means is response to a pivotal deflection of the guide lever means, the rear axle means is arranged at the vehicle for angular movement within an angular range of about ±5°, and in that locking means are provided for locking the rear axle means in a center position.

10. A traffic system according to claim 9, characterized in that means are provided on the rear axle means for limiting angular movement of the further lever means.

11. A traffic system according to claim 10, characterized in that means are provided for elastically centering the further lever means within a movement clearance space.

12. A traffic system for track-guide vehicles which includes at least one vehicle axle having axle means connected with steerable wheels, the traffic system comprising a road-associated guide means for defining a drive track, a guide lever means arranged on the vehicle for detecting a course of the guide means, and further means for transmitting movements of the guide lever means indirectly to the steerable wheels including an auxiliary energy assisted force and movement transmission means, characterized in that the guide lever means is pivotally connected with the axle means, means are provided for limiting a pivotal deflection of the guide lever means over a relatively small angular path corresponding only to a fraction of a maximum deflection angle of the steerable wheels, the means for transmitting movements of the guide lever means includes means for defining a force-flow transmission path of the guide lever means between the guide means and the axle means, the means for defining the force-flow transmission path are constructed so strongly that the vehicle can be track-guided by way of the same in a damage-free and operationally reliable manner also without a deflection of the steerable wheels, a track-directional detection means is provided for detecting at least approximately the guide means direction relative to a longitudinal axis of the vehicle, the means for defining the force-flow transmission path includes means for coupling the track-directional detection means to an input side of the force and movement transmission means, and in that the track-directional detection means includes a detection lever means pivotally connected at a free end of the guide lever means.

13. A traffic system according to claim 1, characterized in that the track directional detection means and the guide lever means are both coupled with the force and movement transmitting means.

14. A traffic system according to claim 1, characterized in that a centering spring means is supported at the axle means for prestressing the guide lever means to a center position.

15. A traffic system according to claim 14, characterized in that the means for limiting a pivotal deflection of the guide lever means includes rigid abutment means arranged on respective sides of the guide lever means.

16. A traffic system according to claim 15, characterized in that the centering spring means are constructed so hard that during most steering engagements required for track corrections, the centering spring means brace the guide lever means prior to an abutment at the rigid abutment means, the force and movement transmission means includes input means operatively connected to the guide lever means, and in that a displacement velocity of the force and movement transmission means is proportional to an amount of deflection of the input means in response to a pivotal deflection of the guide lever means.

17. A traffic system according to claim 16, characterized in that the means for defining the force-flow transmission path include at least one strong guide roller means arranged at a free end of the guide lever means so as to be engageable with the guide means.

18. A traffic system according to claim 17, with the vehicle including a rear axle means characterized in that a further lever means designed for the full transverse forces is pivotally connected at the rear axle means of the vehicle for also guiding the rear axle means along the guide means.

19. A traffic system for track-guided vehicles which includes at least one vehicle axle having axle means connected with steerable wheels, the traffic system comprising a road-associated guide means for defining a drive track, guide lever means arranged on the vehicle for detecting a course of the guide means, and further means for transmitting movements of the guide lever means indirectly to the steerable wheels including an auxiliary energy assisted force and movement transmission means, characterized in that the guide lever means is pivotally connected with the axle means, means are provided for limiting a pivotal deflection of the guide lever means over a relatively small angular path corresponding only to a fraction of a maximum deflection angle of the steerable wheels including rigid abutment means arranged on respective sides of the guide lever means, the means for transmitting movements of the guide lever means includes means for defining a transmission path of the guide lever means between the guide means and the axle means, the means for defining the force-flow transmission path are constructed so strongly that the vehicle can be track-guided by way of the same in a damage-free and operationally reliable manner also without a deflection of the steerable wheels, a track-directional detection means is provided for detecting at least approximately the guide means direction relative to a longitudinal axis of the vehicle, the means for defining the force-flow transmission path includes means for coupling the track-directional detection means to an input side of the force and movement transmission means, a centering means is supported at the axle means for prestressing the guide lever means to a center position, the centering spring means are constructed so hard that during most of the steering engagements required for track corrections, the centering spring means brace the guide lever means prior to an abutment at the rigid abutment means, a displacement velocity of the force and movement transmission means is constructed proportional to an amount of deflection of the input means in response to a pivotal deflection of the guide lever means, the means for defining the force-flow transmission path include at least one strong guide roller means arranged at a free end of the guide lever means so as to be engageable with the guide means, a further lever means designed for the full transverse forces is pivotally connected at the rear axle means of the vehicle for also guiding the rear axle means along the guide means, the rear axle means is arranged at the vehicle for angular movement within an angular range of about ±5°, and in that locking means are provided for locking the rear axle means in a center position.

20. A traffic system according to claim 19, characterized in that means are provided on the rear axle means for limiting angular movement of the further lever means.

21. A traffic system according to claim 20, characterized in that means are provided for elastically centering the further lever means within a movement clearance space.

22. A traffic system according to claim 21, characterized in that the track-directional detection means includes a detection lever means pivotally connected at a free end of the guide lever means.

23. A traffic system according to claim 22, characterized in that the track directional means and the guide lever means are both coupled with the force and movement transmitting means.

24. A traffic system according to claim 1, characterized in that the traffic system is a public passenger local traffic system for vehicles adapted to be driven on tracks or on trackless streets.

25. A traffic system according to claim 1, characterized in that the means for limiting a pivotal deflection of the guide lever means includes rigid abutment means arranged on respective sides of the guide lever means.

26. A traffic system according to claim 1, characterized in that the force and movement transmission means includes an input means operatively connected to the guide lever means, and in that a displacement velocity of the force and movement transmitting means is proportional to an amount of deflection of the input means in response to a pivotal deflection of the guide lever means.

27. A traffic system according to claim 1, characterized in that the means for defining the force-flow transmission path include at least one strong guide roller means arranged at a free end of the guide lever means so as to be engageable with the guide means.

28. A traffic system according to claim 1, with the vehicle including a rear axle means characterized in that a further lever means designed for the full transverse forces is pivotally connected at the rear axle means of the vehicle for also guiding the rear axle means along the guide means.

29. A traffic system according to claim 28, characterized in that means are provided on the rear axle means for limiting angular movement of the further level means.

30. A traffic system according to claim 29, characterized in that means are provided for elastically centering the further lever means within a movement clearance space.

31. A traffic system for track-guided vehicles which includes at least one vehicle axle having axle means connected with steerable wheels, the traffic system comprising a road-associated guide means for defining a drive track, a guide lever means arranged on the vehicle for detecting a course of the guide means, and further means for transmitting movements of the guide lever means indirectly to the steerable wheels including an auxiliary energy assisted force and movement transmission means, characterized in that the guide lever means is pivotally connected with the axle means, means are provided for limiting a pivotal deflection of the guide lever means over a relatively small angular path corresponding only to a fraction of a maximum deflection angle of the steerable wheels, the means for transmitting movements of the guide lever means includes means for defining a transmission path of the guide lever means between the guide means and the axle means, the means for defining the force-flow transmission path are constructed so strongly that the vehicle can be track-guided by way of the same in a damage-free and operationally reliable manner also without a deflection of the steerable wheels, a further lever means designed for the full transverse forces is pivotally connected at a rear axle means of the vehicle for also guiding the rear axle means along the guide means, the rear axle means is arranged at the vehicle for angular movement within an angular range of about ±5°, and in that locking means are provided for locking the rear axle means in a center position.

32. A traffic system for track-guided vehicles which includes at least one vehicle axle having axle means connected with steerable wheels, the traffic system comprising a road-associated guide means for defining a drive track, and guide lever means arranged at the vehicle for detecting a course of the guide means, and further means for transmitting movements of the guide lever means indirectly to the steerable wheels including an auxiliary energy assisted force and movement transmission means, characterized in that the guide lever means is pivotally connected with the axle means, means are provided for limiting a pivotal deflection of the guide lever means over a relatively small angular path corresponding only to a fraction of a maximum deflection angle of the steerable wheels, the means for transmitting movements of the guide lever means includes means for defining a force-flow transmission path of the guide lever means between the guide means and the axle means, the means for defining the force-flow transmission path are constructed so strongly that the vehicle can be track-guided by way of the same in a damage-free and operationally reliable manner also without a deflection of the steerable wheels, a track-directional detection means is provided for detecting at least approximately the guide means direction relative to a longitudinal axis of the vehicle, the means for defining the force-flow transmission path includes means for coupling the track-directional detection means to an input side of the force and movement transmission means, the track-directional detection means includes a detection lever means pivotally connected at a free end of the guide lever means, the means for coupling the track-directional detection means to the input side of the force and movement transmission means includes a connecting rod arranged on the guide lever means and extending through a pivot center thereof, a first slide guide means arranged on a first end of said connecting rod and cooperating with said detection lever means, and a second slide guide means arranged on a second end of said connecting rod and cooperating with a control means of the force and movement transmission means.

33. A traffic system according to claim 32, characterized in that the detection lever means is constructed as a two-armed lever with a free end of one arm of the two-armed lever being engageable with the first slide guide means, and in that a detecting roller is arranged on a free end of the second arm of the two-armed lever for cooperation with guide flanks of the guide means.

34. A traffic system according to claim 33, characterized in that the first and second ends of the connecting rod are cranked in the same direction.

35. A traffic system according to claim 34, characterized in that a centering spring means is supported at the axle means for prestressing the guide lever means to a center position.

36. A traffic system according to claim 35, characterized in that the limiting means for limiting the pivotal deflection of the guide lever means includes abutment means arranged on respective sides of the guide lever means.

37. A traffic system according to claim 36, with a vehicle including a rear axle means, characterized in that the rear axle means is arranged at the vehicle for angular movement within an angular range of about $\pm 5°$.

38. A traffic system according to claim 37, characterized in that a further lever means is pivotally connected at the rear axle means of the vehicle for guiding the rear axle means along the guide means.

39. A traffic system according to claim 38, characterized in that means are provided on the rear axle means for limiting angular movement of the further lever means.

40. A traffic system according to claim 39, characterized in that means are provided for elastically urging the further lever means into a center position.

* * * * *